US012661937B2

(12) United States Patent
Girard et al.

(10) Patent No.: US 12,661,937 B2
(45) Date of Patent: Jun. 23, 2026

(54) TIRE FOR VEHICLE COMPRISING A STIFFENING STRUCTURE

(71) Applicant: COMPAGNIE GENERALE DES ETABLISSEMENTS MICHELIN, Clermont-Ferrand (FR)

(72) Inventors: Mathieu Girard, Clermont-Ferrand (FR); Henri Hinc, Clermont-Ferrand (FR); Michel Deal, Clermont-Ferrand (FR); Sebastien Rigo, Clermont-Ferrand (FR); Antoine Ducloux, Clermont-Ferrand (FR); Thomas Simonelli, Clermont-Ferrand (FR); Stephane Callamand, Clermont-Ferrand (FR); David Hernandez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1165 days.

(21) Appl. No.: 17/415,361

(22) PCT Filed: Dec. 10, 2019

(86) PCT No.: PCT/FR2019/052997
§ 371 (c)(1),
(2) Date: Jun. 17, 2021

(87) PCT Pub. No.: WO2020/128225
PCT Pub. Date: Jun. 25, 2020

(65) Prior Publication Data
US 2022/0063353 A1 Mar. 3, 2022

(30) Foreign Application Priority Data
Dec. 17, 2018 (FR) ...................................... 1873023

(51) Int. Cl.
*B60C 3/00* (2006.01)
*B60C 5/12* (2006.01)
(Continued)

(52) U.S. Cl.
CPC ................ *B60C 17/04* (2013.01); *B60C 3/00* (2013.01); *B60C 5/12* (2013.01); *B60C 5/22* (2013.01);
(Continued)

(58) Field of Classification Search
CPC .. B60C 5/22; B60C 17/04; B60C 3/00; B60C 5/12; B60C 5/20; Y10T 152/10117
(Continued)

(56) References Cited

U.S. PATENT DOCUMENTS 989,431 A * 4/1911 Scaramuzzi .............. B60C 5/20
152/339.1
3,160,192 A * 12/1964 Drew ........................ B60C 9/06
152/559 X
(Continued)

FOREIGN PATENT DOCUMENTS

FR 2638398 A1 5/1990
GB 1507082 4/1978
(Continued)

OTHER PUBLICATIONS

English machine translation of JP 2015-77922 A, Apr. 23, 2015.*
International Search Report dated Apr. 14, 2020, in corresponding PCT/FR2019/052997 (5 pages).

*Primary Examiner* — Adrienne C. Johnstone
(74) *Attorney, Agent, or Firm* — VENABLE LLP

(57) ABSTRACT
A tire (1) has improved handling and comprises a stiffening structure (7) comprising two stiffening elements (8), each extending continuously in the toroidal interior cavity (6) from a crown interface (81) connected to a radially inner
(Continued)

face of the crown (23) to a bead interface (82) connected to an axially inner face of the bead (41). The stiffening structure (7) is distributed circumferentially around the entire circumference of the tire. The crown interface (81) is positioned, with respect to the equatorial plane (XZ), at an axial distance A at most equal to 0.45 times the axial width S and the bead interface (82) is positioned, with respect to a radially innermost point (I) of the axially inner face of the bead (41), at a radial distance B at least equal to 0.10 times the radial height H and at most equal to 0.5 times the radial height H.

15 Claims, 4 Drawing Sheets

(51) Int. Cl.
| | | |
|---|---|---|
| *B60C 5/22* | (2006.01) | |
| *B60C 17/04* | (2006.01) | |
| *B60C 19/00* | (2006.01) | |

(52) U.S. Cl.
CPC ....... *B60C 19/00* (2013.01); *Y10T 152/10117* (2015.01)

(58) Field of Classification Search
USPC ..... 152/155–158, 165, 196–197, 454, 331.1, 152/339.1–342.1, 516, 520, 450, 559
See application file for complete search history.

(56) References Cited

U.S. PATENT DOCUMENTS

| | | | | |
|---|---|---|---|---|
| 3,675,703 | A | * | 7/1972 | Watts ........................ B60C 9/06 |
| | | | | 152/559 |
| 10,766,307 | B2 | | 9/2020 | Vilcot et al. |
| 2005/0279438 | A1 | | 12/2005 | Onracek |
| 2018/0194169 | A1 | | 7/2018 | Vilcot et al. |
| 2021/0162808 | A1 | | 6/2021 | Girard et al. |
| 2022/0016930 | A1 | * | 1/2022 | Wada ........................ B60C 5/22 |

FOREIGN PATENT DOCUMENTS

| | | | |
|---|---|---|---|
| GB | 2299554 | A | 10/1996 |
| JP | 2006-264493 | A | 10/2006 |
| JP | 2015-77922 | A | 4/2015 |
| WO | 2017/005713 | A1 | 1/2017 |
| WO | 2019/115917 | A1 | 6/2019 |
| WO | WO-2020/110420 | A1 * | 6/2020 |

* cited by examiner

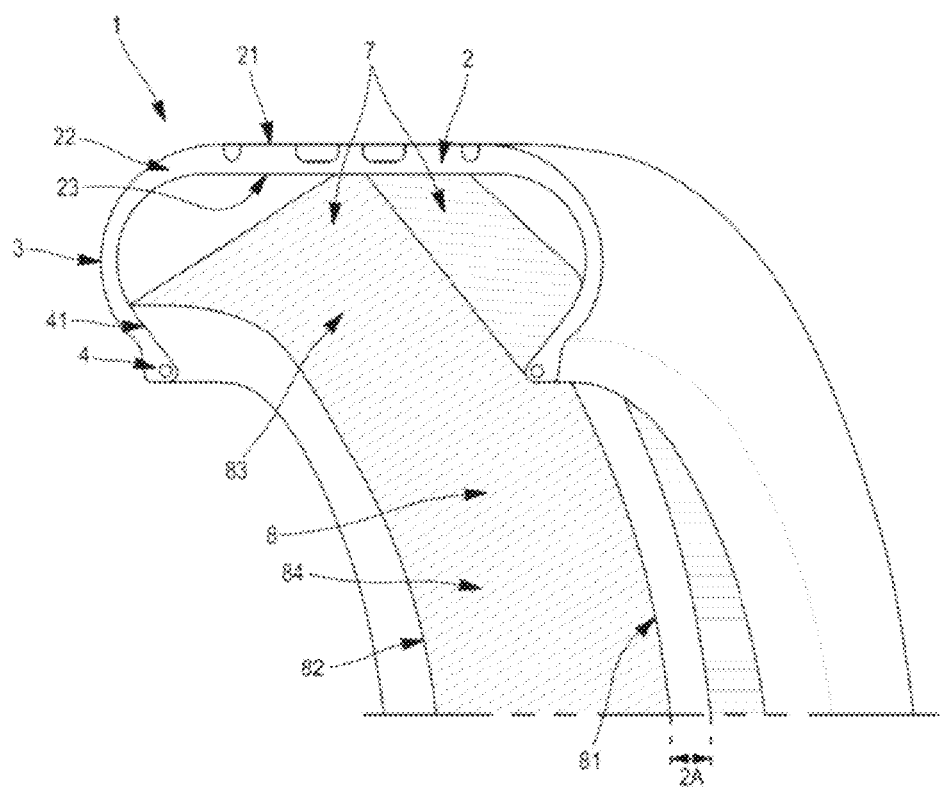
FIG. 3
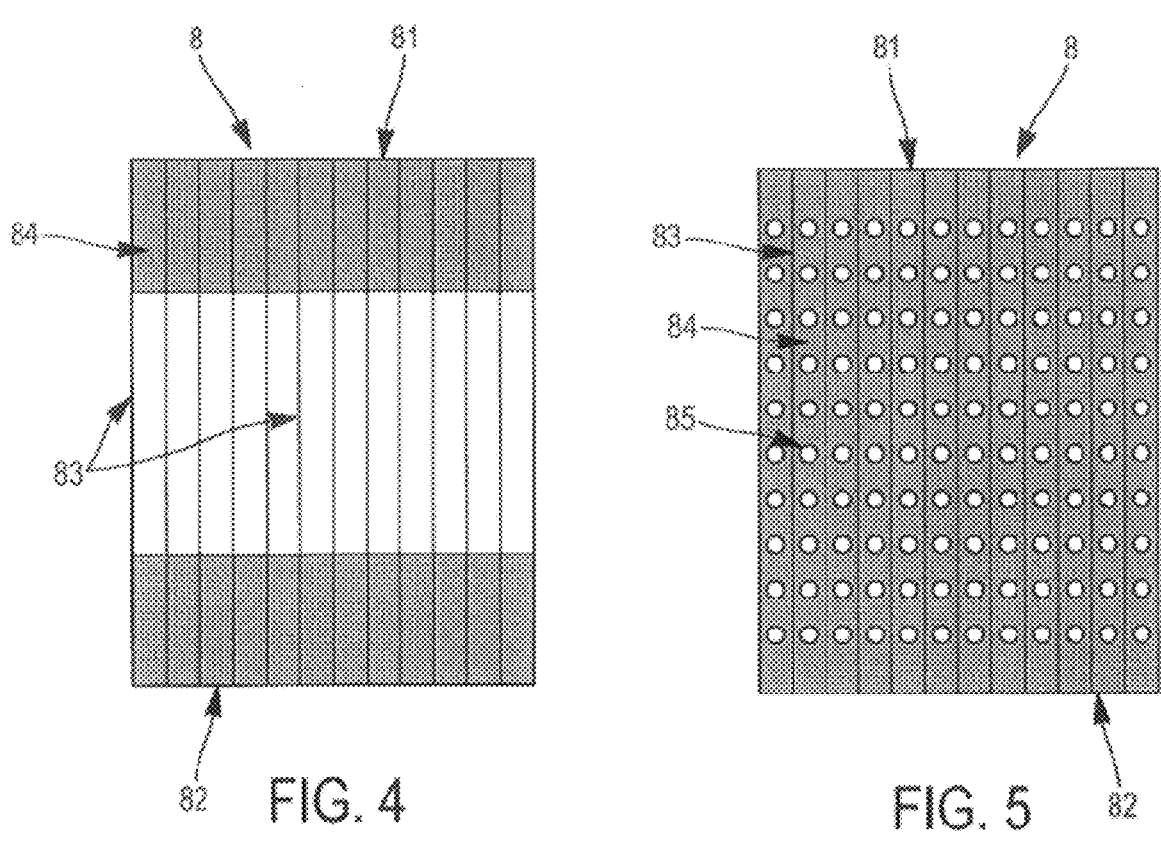
FIG. 4                 FIG. 5

TIRE FOR VEHICLE COMPRISING A STIFFENING STRUCTURE

BACKGROUND

The invention relates to a radial tyre intended to be fitted to a vehicle.

The field of tyres more particularly under study here is that of passenger vehicle tyres, the meridian cross section of which is characterized by a section width S and a section height H, within the meaning of the European Tyre and Rim Technical Organisation, or ETRTO, standard, such that the ratio H/S, expressed as a percentage, is at most equal to 65, and the section width S is at least equal to 195 mm. Moreover, the diameter at the seat D, defining the diameter of the mounting rim of the tyre, is at least equal to 15 inches, and generally at most equal to 21 inches. The example more particularly under study in the context of the invention is a tyre of the size 255/35R19.

However, a tyre according to the invention may equally be used on any other type of vehicle, such as a two-wheeled vehicle, a heavy-duty vehicle, an agricultural vehicle, a construction plant vehicle or an aircraft or, more generally, on any rolling device.

In the following text, and by convention, the circumferential direction XX', axial direction YY' and radial direction ZZ' refer to a direction tangential to the tread surface of the tyre in the direction of rotation of the tyre, to a direction parallel to the axis of rotation of the tyre, and to a direction perpendicular to the axis of rotation of the tyre, respectively. "Radially inside" and "radially outside" mean "closer to the axis of rotation of the tyre" and "further away from the axis of rotation of the tyre", respectively. "Axially inside" and "axially outside" mean "closer to the equatorial plane of the tyre" and "further away from the equatorial plane of the tyre", respectively, the equatorial plane XZ of the tyre being the plane passing through the middle of the tread surface of the tyre and perpendicular to the axis of rotation of the tyre.

In general, a tyre comprises a crown having two axial ends that are each extended radially towards the inside by a sidewall and then by a bead intended to come into contact with a rim, the assembly delimiting a toroidal interior cavity. More specifically, the crown comprises, radially from the outside towards the inside, a tread, intended to come into contact with the ground via a tread surface, and a crown reinforcement intended to reinforce the crown of the tyre. A carcass reinforcement connects the two sidewalls to one another and is anchored, in each bead, to a circumferential reinforcing element usually of the bead wire type.

The standards relating to tyres, such as those of the ETRTO, for example, define nominal conditions of use for a tyre of a given size, characterized by a section width S, a section height H and a seat diameter D. Thus, a tyre of a given size is intended to be mounted on a nominal rim, to be inflated to a nominal pressure P and to be subjected to a nominal load Z. The load applied to the tyre is thus absorbed by the tyre, by virtue of its pneumatic stiffness, resulting from the inflation pressure, and by virtue of its intrinsic structural stiffness.

A tyre needs to meet a number of performance criteria such as, by way of example and not exhaustively, the handling, rolling resistance, grip, wear and noise, this often involving mutually contradictory design choices. It is thus often the case that design choices made to improve one given performance aspect lead to a worsening of another performance aspect. This is the case, for example, when seeking a satisfactory compromise between handling and rolling resistance.

It is known that the handling of a tyre, which characterizes its ability to withstand the various mechanical stress loadings to which it is subjected during running, such as cornering stress loadings and/or transverse stress loadings, is essentially dependent on its mechanical cornering stiffness $D_Z$ and transverse stiffness $K_{YY}$, respectively. The higher these mechanical stiffnesses, the better the handling of the tyre.

In the prior art, in order to improve the handling of the tyre, those skilled in the art have designed, for example, very stiff tyre beads, having a significant volume resulting from a high axial thickness and/or high radial height, and comprising elastomer materials that have a high elastic modulus and high hysteresis, that is to say materials that are both stiff and dissipative. The counterpart to such a design is an increase in the rolling resistance values, and therefore worsening of the rolling resistance performance, with a corresponding increase in fuel consumption.

An alternative solution to the conventional tyre is proposed in document WO2017005713, in the form of a tyre-type device comprising a radially outer and a radially inner structure of revolution, a bearing structure made up of identical bearing elements, in tension outside the contact patch and in compression in the contact patch, and two sidewalls. The bearing elements are filamentary and are connected to the radially inner face of the radially outer structure of revolution by a radially outer fabric and to the radially outer face of the radially inner structure of revolution by a radially inner fabric, respectively. Furthermore, the mean surface density D of the bearing elements per unit area of radially outer structure of revolution, expressed in $1/m^2$, is at least equal to $(S/S_E)*Z/(A*F_r)$, where S is the area, in $m^2$, of the radially inner face of the radially outer structure of revolution, $S_E$ is the connecting area, in $m^2$, of the radially outer fabric with the radially inner face of the radially outer structure of revolution, Z is the nominal radial load, in N, A is the area of contact with the ground, in $m^2$, and $F_r$ is the force at break, in N, of a bearing element. This solution makes it possible to eliminate the dissipative beads of a conventional tyre and therefore to reduce the rolling resistance drastically, while at the same time ensuring good handling by virtue of the fact that the filamentary elements of the bearing structure react the mechanical cornering and transverse stress loadings. However, this tyre device has in particular the drawback of requiring the use of a non-standard rim.

The inventors have set themselves the objective of designing a tyre, which is able to be mounted on a standard rim, with improved handling compared with a standard tyre of the prior art, and with a rolling resistance at most equal to that of this reference tyre.

SUMMARY

This objective has been achieved by a vehicle tyre, which is intended to be mounted on a nominal rim and inflated to a nominal pressure P, has an axial width S and a radial height H in the mounted and inflated state, and comprises:

a crown having a radially outer tread surface, intended to come into contact with the ground, and two axial ends, each extended radially towards the inside by a sidewall and then by a bead intended to come into contact with the rim, the crown, the sidewalls and the beads delimiting a toroidal interior cavity, the tyre having an equatorial plane passing through the middle of its tread surface and perpendicular to an axis of rotation, the tyre comprising a stiffening structure comprising two stiffening elements, each extending continuously in the toroidal interior cavity from a crown interface connected to a radially inner face of the crown to a bead interface connected to an axially inner face of the bead, the stiffening structure being distributed circumferentially around the entire circumference of the tyre, the crown interface being positioned, with respect to the equatorial plane, at an axial distance A at most equal to 0.45 times the axial width S, and the bead interface being positioned, with respect to a radially innermost point of the axially inner face of the bead, at a radial distance B at least equal to 0.10 times the radial height H and at most equal to 0.5 times the radial height H.

The principle behind the invention is to integrate, into a conventional tyre, a stiffening structure that is intended to increase the overall stiffness of the tyre, this stiffness having a structural component, referred to as structural stiffness, afforded by the reinforcing structure of the tyre, and a tyre component, referred to as the tyre stiffness, afforded by the pressure of the inflation gas. The stiffening structure contributes to the tyre stiffness.

More specifically, the stiffening structure according to the invention makes it possible to simultaneously increase the radial stiffness $K_{ZZ}$, the transverse or axial stiffness $K_{YY}$, and the cornering stiffness $D_Z$ of the tyre, compared with the reference tyre. The radial stiffness $K_{ZZ}$, expressed in daN/mm, is the radial force Fz generated by the tyre upon application of a radial displacement equal to 1 mm. The transverse or axial stiffness $K_{YY}$, expressed in daN/mm, is the axial force $F_Y$ generated by the tyre upon application of an axial displacement equal to 1 mm. And finally, the cornering stiffness $D_Z$, expressed in daN/°, is the axial force $F_Y$ generated by the tyre during running with an angle of 1° applied about a radial axis ZZ'.

By increasing the radial stiffness $K_{ZZ}$, the stiffening structure limits the radial deformations of the crown, during running, and, in particular, the reverse-deformation, that is to say the radial deformation opposite the contact patch in which the tread surface of the tyre is in contact with the ground. Thus, during the running of the tyre, as the wheel turns, the stiffening structure makes it possible to limit the amplitude of the cyclic deformations of the tyre, and in particular of the tread thereof, and therefore limit the resultant dissipation of energy, thereby contributing to reducing the rolling resistance. Furthermore, under radial stress loading, the contact patch is unchanged, that is to say substantially maintains the same surface area, making it possible to maintain the same performance in terms of grip as for the reference tyre.

By increasing the transverse or axial stiffness $K_{YY}$ and the cornering stiffness $D_Z$, the stiffening structure will contribute to improving the handling, under transverse stress loading, for example when running with drift thrust. Furthermore, under transverse stress loading, the contact patch ensures the most uniform possible distribution of the contact pressures, thereby making it possible to increase the performance in terms of transverse grip.

Furthermore, the stiffening structure contributes at least partially to bearing the load applied to the tyre, such that this applied load is reacted jointly by the tyre, by virtue of its tyre stiffness and of its intrinsic structural stiffness, and by the stiffening structure. Regarding load bearing, when the tyre is subjected to a nominal radial load Z, the portion of stiffening structure that is connected to the portion of tyre in contact with the ground is made to buckle under compression and the portion of stiffening structure connected to the portion of tyre not in contact with the ground is at least partially under tension.

As a result, the presence of a stiffening structure makes it possible to reduce the contribution made by the reinforcing structure of the tyre to load bearing, and therefore, where appropriate, makes it possible for its intrinsic structural stiffness to be reduced, for example by reducing the volume of the beads. Since the beads of a conventional tyre, as is known, dissipate a significant amount of energy on account of their volume and of the hysteresis-prone nature of the elastomer compound of which they are made, reducing their volume would thus make it possible to significantly reduce the rolling resistance.

From a structural standpoint, according to the invention, the stiffening structure comprises two stiffening elements that extend continuously in the toroidal interior cavity from a crown interface connected to a radially inner face of the crown to a bead interface connected to an axially inner face of the bead. In other words, the stiffening structure comprises two stiffening elements that connect the crown of the tyre to a bead, this creating triangulation between the crown of the tyre and each bead. The connections between the stiffening element and the crown and the bead, respectively, may be either direct or indirect, for example via an attachment means.

Furthermore, the stiffening structure is distributed circumferentially around the entire circumference of the tyre. More specifically, the stiffening structure either extends circumferentially and continuously around the entire circumference of the tyre, or is distributed circumferentially and periodically around the entire circumference of the tyre. As a result, the triangulation between the crown and the beads of the tyre is effective around the entire circumference of the tyre.

Likewise according to the invention, the crown interface of the stiffening element is positioned, with respect to the equatorial plane, at an axial distance A at most equal to 0.45 times the axial width S. Above this value, the stiffening element has a direction that forms too small an angle with respect to the radial direction ZZ', this making an insufficient contribution to the transverse stiffness $K_{YY}$ and cornering stiffness $D_Z$, respectively. However, even in the case of an angle close to 0°, the inventors have been able to observe an increase in the radial stiffness $K_{ZZ}$, transverse stiffness $K_{YY}$ and cornering stiffness $D_Z$, respectively.

Also according to the invention, the bead interface of the stiffening element is positioned, with respect to a radially innermost point of the axially inner face of the bead, at a radial distance B at least equal to 0.10 times the radial height H and at most equal to 0.5 times the radial height H. Above 0.5 times the radial height H, any stiffening element has a direction that forms too large an angle with respect to the radial direction ZZ', this making an insufficient contribution to the radial stiffness $K_{ZZ}$. Below 0.10 times the radial height H, the bead interface is positioned in a stiff region of the bead, in the vicinity of the bead wire, this promoting the transmission of noise between the crown of the tyre in contact with the ground and the bead in contact with the rim. The choice of the radial distance B therefore results from a compromise between the desire for sufficient radial, transverse and cornering stiffnesses, respectively, through a suitable inclination of the stiffening element with respect to the equatorial plane, and the desire for an acceptable level of noise, avoiding positioning the bead interface in the stiff region of the bead. What is more, sufficiently high radial positioning of the bead interface allows greater tolerance of variations in length of the stiffening element, by virtue of this interface being positioned in a region of the tyre that is less stiff than that of the bead.

Preferably, the two stiffening elements are positioned symmetrically on either side of the equatorial plane. This embodiment allows the forces passing through the stiffening structure to be distributed equally between the two halves of the tyre, and therefore makes it possible for the tyre to handle symmetrically during running. Furthermore, a symmetric stiffening structure is simpler to manufacture.

Advantageously, the crown interface is positioned, with respect to the equatorial plane, at an axial distance A at least equal to 0.05 times and at most equal to 0.15 times the axial width S. The inventors have effectively demonstrated that an axial distance A substantially equal to 0.10 times the axial width S was an advantageous embodiment.

Preferably, the bead interface is positioned, with respect to a radially innermost point of the axially inner face of the bead, at a radial distance B at most equal to 0.35 times the radial height H. According to the inventors, a range of values for the radial distance B of between 0.1 times and 0.35 times the radial height H is optimal as regards the compromise between the performance aspects of behaviour and noise, respectively.

The crown interface is advantageously distributed across a width A1 at least equal to 0.1 times the axial width S. Below this value, the local stresses at the crown interface become too high, and hence there is a risk of pullout of the crown interface.

According to a preferred embodiment of the crown interface, the crown interface comprises a cushion made of elastomer compound positioned at least partially between the stiffening element and the radially inner face of the crown. The presence of an elastomer cushion at the crown interface makes it possible to distribute the local interface stresses better.

With the crown interface being distributed across a width A1, the bead interface is advantageously distributed across a width B1 at least equal to the width A1. Specifically, the bead interface has to transmit the same tensile forces as the crown interface, since these two interfaces are the two ends of a stiffening element working under tension, but with a greater inclination of the stiffening element with respect to the attachment surface, hence a greater normal pullout force at the bead. As a result, it is necessary to distribute this normal force sufficiently.

According to a preferred embodiment of the bead interface, the bead interface comprises a cushion made of elastomer compound at least partially in contact with the stiffening element and the axially inner face of the bead. The presence of an elastomer cushion at the bead interface makes it possible to distribute the local interface stresses better.

According to a variant of the preferred embodiment of the bead interface, the cushion made of elastomer compound of the bead interface is at least partially in contact with a reinforcing layer such that the cushion is delimited by the stiffening element, the axially inner face of the bead and the reinforcing layer. The presence of a reinforcing layer delimiting the cushion radially towards the outside makes it possible to have more symmetric anchoring of the stiffening element, comprising two reinforcing layer elements on either side of the mid-plane of the stiffening element. This reinforcing layer also makes it possible to limit the deformations of the elastomer cushion, and therefore the dissipation of energy in this cushion, this contributing to reducing the rolling resistance.

As regards the materials that make up the stiffening structure, any stiffening element advantageously comprises a polymeric material, such as an aliphatic polyamide, an aromatic polyamide or a polyester, or a metal material, such as steel, or a glass- or carbon-type material or any combination of the above materials. Polymer materials, in particular elastomer materials, and metal materials, such as steel, are commonly used in the field of tyres. Glass and carbon are alternative materials that are conceivable for use in tyres. In a first variant of the material, any stiffening element advantageously comprises polyethylene terephthalate (PET). PET is commonly used in the field of tyres on account of a good compromise between its mechanical properties, such as its resistance to breaking under tension, and its cost. In a second variant of the material, any stiffening element also advantageously comprises an aliphatic polyamide, such as nylon. Nylon is also commonly used in the field of tyres for the same reasons as PET.

In an advantageous embodiment, the stiffening element is not sealed. Thus, the stiffening element allows the inflation gas to pass through from one side of the stiffening element to the other. As a result, the stiffening element does not delimit a secondary pressurized cavity of the tyre. Not sealed will be understood as meaning that the stiffening element is not sealed with respect to an inflation gas of the tyre and is therefore permeable to this inflation gas such that the pressure is uniform in the toroidal interior cavity at all times.

According to a preferred embodiment of the stiffening element, each stiffening element comprises filamentary reinforcing elements that are coated, at least in the vicinity of the crown interface and bead interface, respectively, with an elastomer compound, such that the stiffening element is not sealed. The filamentary or one-dimensional reinforcing elements have mechanical behaviour of the filamentary type, meaning that they can be subjected only to tensile or compression forces along their mean lines. Usually, the filamentary reinforcing elements are textile reinforcers, made up of an assembly of spun textile filaments made of polymeric material, such as an aliphatic polyamide, an aromatic polyamide or a polyester, or metal cords, made up of an assembly of metal threads generally made of steel. Furthermore, the filamentary reinforcing elements are at least partially uncoated, except for in the vicinity of the crown interface and bead interface, or are coated with an elastomer compound comprising holes, so as to allow the inflation gas to pass through from one side of the stiffening element to the other, as already described above. In other words, the filamentary reinforcing elements are not completely coated with an elastomer compound, unlike the reinforcing fabrics usually used in the field of tyres. As a result, as already described above, the stiffening element does not delimit a secondary pressurized cavity of the tyre.

According to a first variant of the preferred embodiment of the stiffening element, each stiffening element is made up of a family of filamentary reinforcing elements that are mutually parallel and form, with a circumferential direction, an angle C1 at least equal to 85° and at most equal to 95°. In this first variant, the stiffening element therefore comprises a single layer of filamentary reinforcing elements that are positioned in substantially meridian planes, a meridian plane being defined by the axial direction and a radial direction.

According to a second variant of the preferred embodiment of the stiffening element, each stiffening element is made up of a first family of filamentary reinforcing elements that are mutually parallel and form, with a circumferential direction, an angle C1 at least equal to 45° and at most equal to 75°, said first family being crossed with respect to a second family of filamentary reinforcing elements that are mutually parallel and form, with a circumferential direction, an angle C2 at least equal to 45° and at most equal to 75°. In this second variant, the stiffening element therefore comprises two layers of filamentary reinforcing elements that are crossed from one layer to the next and are significantly inclined with respect to the circumferential direction, but not necessarily inclined at the same angle. This significant inclination of the filamentary reinforcing elements contributes to an increase in the circumferential stiffness $K_{XX}$, corresponding to the circumferential force $F_X$ generated by the tyre during a circumferential displacement equal to 1 mm. As a result, it makes it possible to limit the deformations of the contact patch in which the tyre is in contact with the ground during longitudinal braking or acceleration stress loadings.

As regard this second variant, the angles C1 and C2 are also preferably equal in terms of absolute value and opposite. In this particular case, the filamentary reinforcing elements are inclined in a symmetric manner with respect to the circumferential direction, resulting in identical circumferential stiffening in both rolling directions of the tyre.

BRIEF DESCRIPTION OF THE DRAWINGS

The invention is illustrated in the figures referenced below, which are not to scale and are described in the following text:

FIG. 3: Perspective view of a preferred embodiment of the invention, with stiffening elements comprising filamentary reinforcing elements.

FIG. 4: Stiffening element comprising filamentary reinforcing elements coated, in the vicinity of the crown interface and bead interface, with an elastomer compound.

FIG. 5: Stiffening element comprising filamentary reinforcing elements coated with an elastomer compound having holes.

DETAILED DESCRIPTION

Figure 1:
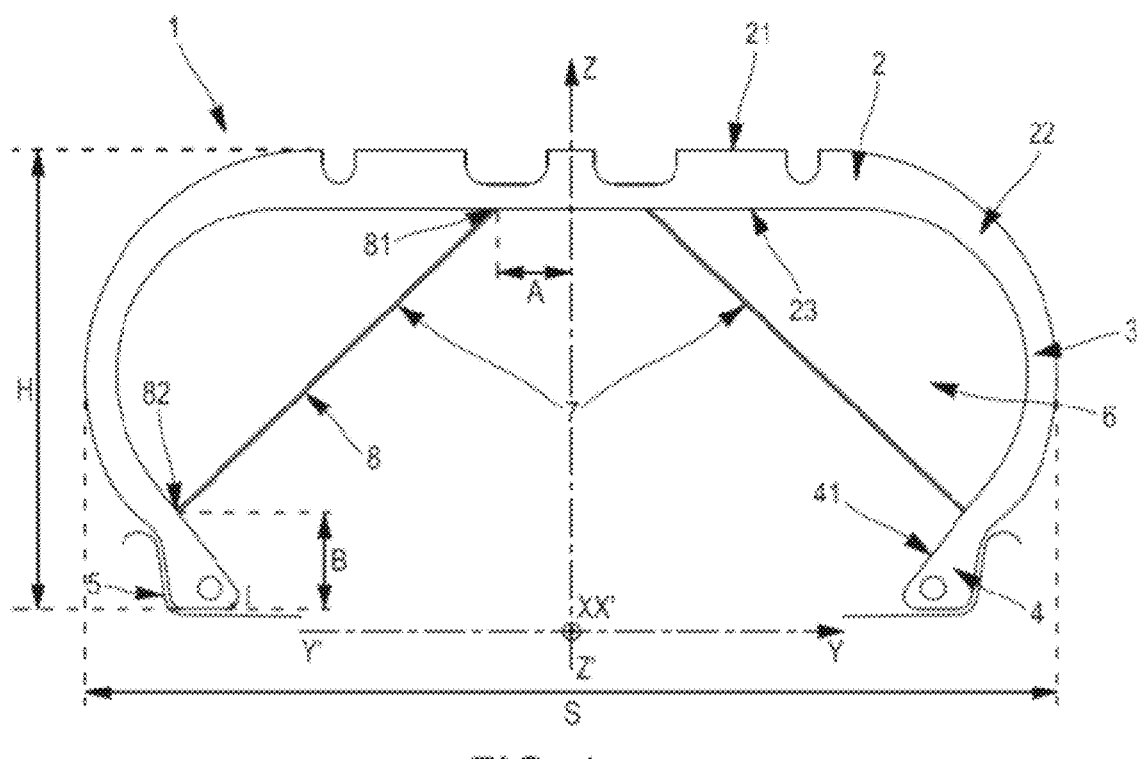
FIG. 1: Meridian section through a tyre according to the invention.

FIG. 1 shows a meridian section through a tyre according to the invention. The tyre 1 is intended to be mounted on a nominal rim 5 and inflated to a nominal pressure P, and has an axial width S and a radial height H in the mounted and inflated state. The tyre 1 comprises a crown 2 having a radially outer tread surface 21, intended to come into contact with the ground, and two axial ends 22, each extended radially towards the inside by a sidewall 3 and then by a bead 4 intended to come into contact with the rim 5. The crown 2, the sidewalls 3 and the beads 4 delimit a toroidal interior cavity 6. The tyre 1 has an equatorial plane XZ passing through the middle of its tread surface 21 and perpendicular to an axis of rotation YY'. According to the invention, the tyre 1 comprises a stiffening structure 7 comprising two stiffening elements 8 that extend continuously in the toroidal interior cavity 6 from a crown interface 81 connected to a radially inner face of the crown 23 to a bead interface 82 connected to an axially inner face of the bead 41. The stiffening structure 7 is distributed circumferentially around the entire circumference of the tyre. The two stiffening elements 8 that make up the stiffening structure 7 are not connected to one another inside the toroidal interior cavity 6, extend continuously in the toroidal interior cavity 6 without intersecting the equatorial plane XZ and are symmetric with respect to the equatorial plane XZ. The crown interface 81 of the stiffening element 8 is positioned, with respect to the equatorial plane XZ, at an axial distance A at most equal to 0.45 times the axial width S. The bead interface 82 of the stiffening element 8 is positioned, with respect to a radially innermost point I of the axially inner face of the bead 41, at a radial distance B at least equal to 0.10 times the radial height H and at most equal to 0.5 times the radial height H.

Figure 2:
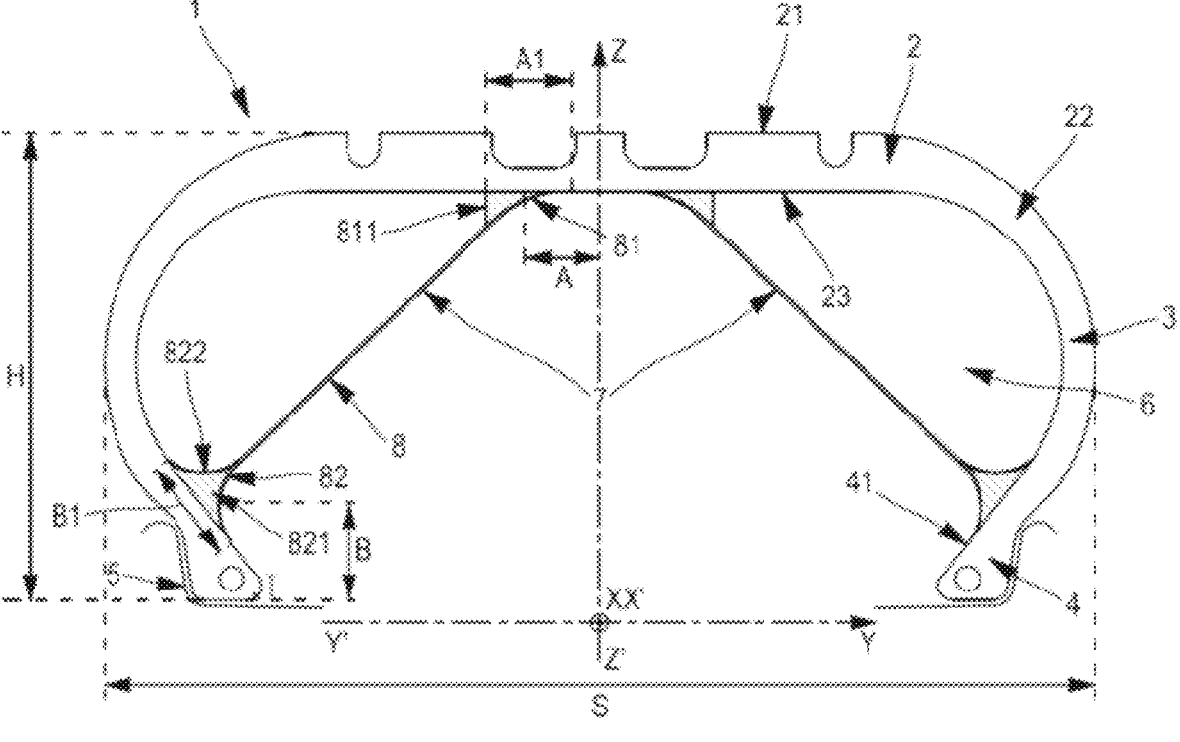
FIG. 2: Meridian section through a tyre according to a preferred embodiment of the invention, with elastomer cushions at the crown interface and bead interface.

FIG. 2 shows a meridian section through a tyre according to a preferred embodiment of the invention, with elastomer cushions at the crown interface and bead interface. The additional elements with respect to FIG. 1 are described below. The crown interface 81 is distributed across a width A1 at least equal to 0.1 times the axial width S and comprises a cushion 811 made of elastomer compound positioned at least partially between the stiffening element 8 and the radially inner face of the crown 23. The bead interface 82 is distributed across a width B1 at least equal to the width A1 and comprises a cushion 821 made of elastomer compound at least partially in contact with the stiffening element 8 and the axially inner face of the bead 41. Lastly, the cushion 821 made of elastomer compound of the bead interface 82 is at least partially in contact with a reinforcing layer 822 such that the cushion 821 is delimited by the stiffening element 8, the axially inner face of the bead 41 and the reinforcing layer 822.

FIG. 3 shows a perspective view of a preferred embodiment of the invention, with stiffening elements comprising filamentary reinforcing elements. The stiffening structure 7 is made up of two stiffening elements 8 comprising filamentary reinforcing elements 83 that extend continuously in the toroidal interior cavity from a crown interface 81 connected to a radially inner face of the crown 23 to a bead interface 82 connected to an axially inner face of the bead 41. The stiffening element 8 is not sealed. In this instance, the filamentary reinforcing elements 83 are coated, at least in the vicinity of the crown interface 81 and bead interface 82, respectively, with an elastomer compound 84, such that the stiffening element 8 is not sealed.

FIG. 4 shows a stiffening element comprising filamentary reinforcing elements coated, in the vicinity of the crown interface and bead interface, with an elastomer compound. The stiffening element 8 comprises filamentary reinforcing elements 83 that are coated, in the vicinity of the crown interface 81 and bead interface 82, respectively, with an elastomer compound 84, such that the stiffening element 8 is not sealed. As a result, the pressure of the inflation gas is identical on both sides of the stiffening element 8, which therefore does not delimit a secondary cavity with a pressure different from that of the main cavity.

FIG. 5 shows a stiffening element comprising filamentary reinforcing elements coated with an elastomer compound having holes. The stiffening element 8 comprises filamentary reinforcing elements 83 that are coated along their entire length between the crown interface 81 and bead interface 82, respectively, with an elastomer compound 84 comprising holes, such that the stiffening element 8 is not sealed. This is another embodiment of a stiffening element that is not sealed.

Figure 6:
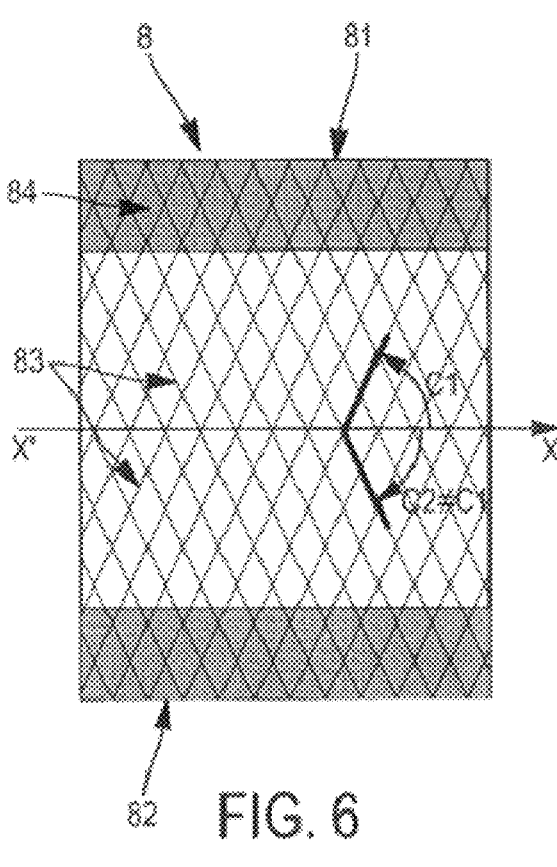
FIG. 6: Stiffening element comprising a family of substantially radial filamentary reinforcing elements.

FIG. 6 shows a stiffening element comprising a family of substantially radial filamentary reinforcing elements. The stiffening element 8 is made up of a family of filamentary reinforcing elements 83 that are mutually parallel and form, with a circumferential direction XX', an angle C1 at least equal to 85° and at most equal to 95°. The filamentary reinforcing elements 83 are all coated, in the vicinity of the crown interface 81 and bead interface 82, respectively, with an elastomer compound 84, such that the stiffening element 8 is not sealed.

Figure 7:
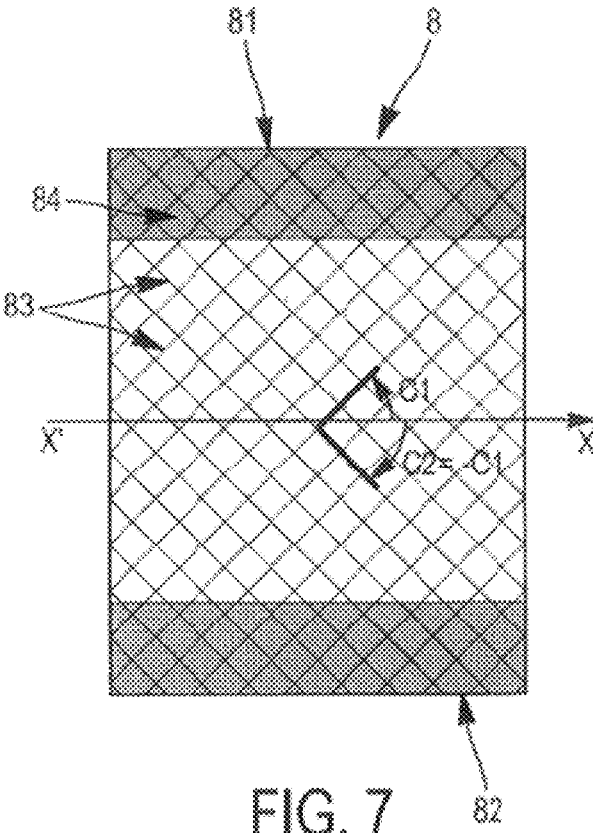
FIG. 7: Stiffening element comprising two families of filamentary reinforcing elements that are inclined with respect to the circumferential direction and crossed from one family to the other.

FIG. 7 shows a stiffening element comprising two families of filamentary reinforcing elements that are inclined with respect to the circumferential direction and crossed from one family to the other. The stiffening element 8 is made up of a first family of filamentary reinforcing elements 83 that are mutually parallel and form, with a circumferential direction XX', an angle C1 at least equal to 45° and at most equal to 75°, said first family being crossed with respect to a second family of filamentary reinforcing elements 83 that are mutually parallel and form, with a circumferential direction XX', an angle C2 at least equal to 45° and at most equal to 75°. In the case shown, the angles C1 and C2 are equal in terms of absolute value and opposite, that is to say symmetric with respect to the circumferential direction XX'. The filamentary reinforcing elements 83 are all coated, in the vicinity of the crown interface 81 and bead interface 82, respectively, with an elastomer compound 84, such that the stiffening element 8 is not sealed.

Figure 8:
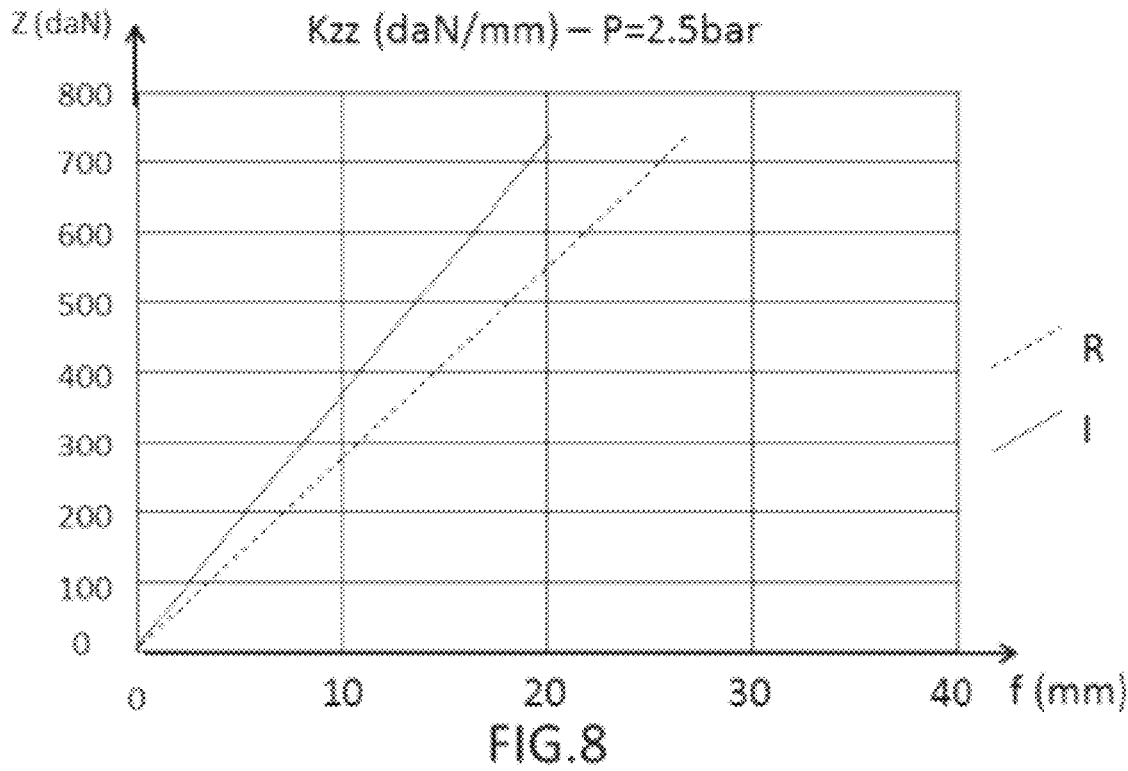
FIG. 8: Comparison of radial stiffnesses $K_{ZZ}$ between a tyre according to the invention and a reference tyre of the prior art.

FIG. 8 is a graph showing a comparison of the radial stiffnesses $K_{ZZ}$ between a tyre according to the invention and a reference tyre of the prior art. For a given inflation pressure P and a given radial distortion f, the radial force Z generated by the tyre according to the invention is higher than that generated by the reference tyre. The gradient of the curve of radial force Z as a function of radial distortion f of the tyre, that is to say the radial displacement of the crown of the tyre, represents the radial stiffness $K_{ZZ}$ of the tyre. Therefore, the radial stiffness $K_{ZZ}$ of the tyre according to the invention is higher than that of the reference tyre.

Figure 9:
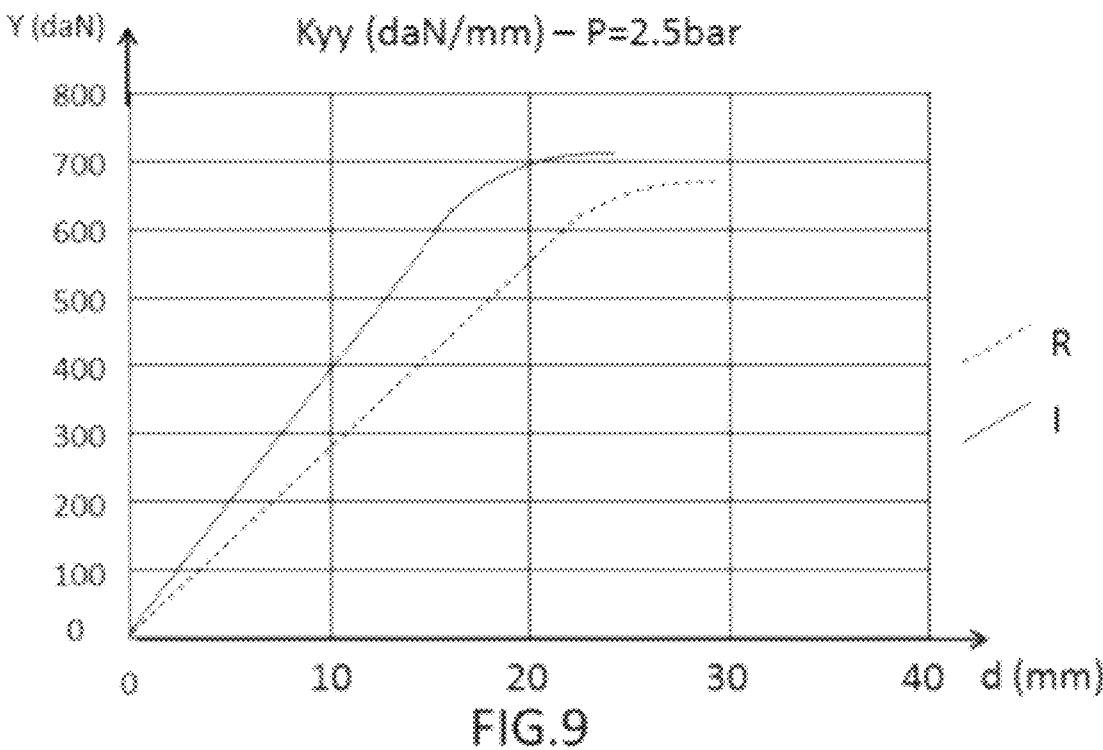
FIG. 9: Comparison of transverse or axial stiffnesses $K_{YY}$ between a tyre according to the invention and a reference tyre of the prior art.

FIG. 9 is a graph showing a comparison of the transverse or axial stiffnesses $K_{YY}$ between a tyre according to the invention and a reference tyre of the prior art. For a given inflation pressure P, a given radial distortion f, and a given transverse offset d, the transverse force Y generated by the tyre according to the invention is higher than that generated by the reference tyre. The gradient of the substantially linear portion of the curve of transverse force Y as a function of transverse offset d of the tyre, that is to say the transverse displacement thereof, represents the transverse stiffness $K_{YY}$ of the tyre. The substantially linear portion of the curve of transverse force Y corresponds, in the case shown, to a transverse offset at most equal to around 20 mm. Therefore, the transverse stiffness $K_{YY}$ of the tyre according to the invention is higher than that of the reference tyre. Above 20 mm of transverse offset, the transverse force Y reaches a plateau on account of the slipping of the tread surface of the tyre across the ground. In the case of the invention, this stabilizing of the transverse force Y occurs at a higher level, above 25 mm, on account of a higher transverse stiffness $K_{YY}$ making it possible to maintain a more uniform distribution of pressure in the contact patch, under transverse force Y.

The invention was studied more particularly in the case of a passenger vehicle tyre of size 255/35R19. A reference tyre R was thus compared with a first example of a tyre I1 according to the invention, with a crown interface and bead interface in accordance with FIG. 2, and comprising two stiffening elements made up of a family of filamentary reinforcing elements of the cord type that are mutually parallel and form, with the circumferential direction, an angle C1 substantially equal to 90° in accordance with FIG. 4. It was also compared with a second example of a tyre I2 according to the invention, with a crown interface and bead interface in accordance with FIG. 2, and comprising two stiffening elements made up of a first family of filamentary reinforcing elements of the cord type that are mutually parallel and form, with a circumferential direction, an angle C1 equal to 60°, said first family being crossed with respect to a second family of filamentary reinforcing elements of the cord type that are mutually parallel and form, with the circumferential direction, an angle C2 equal to the angle C1 in terms of absolute value but opposite thereto in accordance with FIG. 7.

The reference tyre R, tyre according to the invention I1 and tyre according to the invention I2, respectively, are mounted on a nominal 9J19 rim and inflated to a nominal pressure P of 2.5 bar. Their axial widths S and their radial heights H, in the mounted and inflated state, are equal to 255 mm and 89 mm, respectively.

The first example I1 is characterized by a stiffening structure, as shown in FIG. 2, with two stiffening elements that are symmetric with respect to the equatorial plane of the tyre. Each stiffening element is composed of a juxtaposition of filamentary reinforcing elements of the cord type that have a cross-sectional area equal to 0.8 mm², are mutually parallel and are distributed at a spacing equal to 1.25 mm. The constituent material of the stiffening elements is a fabric made up of textile reinforcers made of polyester (or PET) that are coated in the vicinity of the crown interface and bead interface with an elastomer compound. The textile reinforcers are positioned in substantially meridian planes of the tyre. The crown interface and bead interface are distributed across axial widths A1, of between 0.1 and 0.15 times the axial width S of the tyre, and B1, of between 0.25 and 0.3 times the radial height H of the tyre, respectively. Moreover, they respectively comprise elastomer cushions that are positioned between the stiffening element and the attachment wall. Furthermore, the crown interface and bead interface are produced by hot vulcanization.

The second example I2 differs from the first example I1 in the makeup of the two stiffening elements, which are each made up of two families of filamentary reinforcing elements of the cord type that are crossed with respect to one another, forming, with the circumferential direction, two angles C1 and C2 that are equal to 60° in terms of absolute value and opposite.

Table 1 below summarizes the differences in performance obtained between the first example of a tyre I1 and the reference tyre R, and between the second example of a tyre I2 and the reference tyre, respectively:

TABLE 1

| Performance characteristics | Difference in performance between the tyre I1 and the tyre R | Difference in performance between the tyre I2 and the tyre R |
|---|---|---|
| Radial stiffness $K_{ZZ}$ | No difference | +20% |
| Transverse stiffness $K_{YY}$ | +70% | +85% |
| Rolling resistance (calculated) | −0.8 kg/t | Not determined |
| Noise inside vehicle | No difference | Not determined |

The results of Table 1 show an improved compromise in performance between the rolling resistance and the handling for the invention. It should be noted that this compromise is variable. Specifically, the prestress applied to the stiffening elements during the inflation of the tyre can be varied, resulting in a variation in stiffnesses, and in particular in the transverse stiffness $K_{YY}$, depending on the level of prestress.

The invention claimed is:

1. A vehicle tire, intended to be mounted on a nominal rim and inflated to a nominal pressure P, the vehicle tire having an axial width S and a radial height H in the mounted and inflated state, and comprising a crown having a radially outer tread surface, intended to come into contact with ground, and two axial ends, each extended radially inwards by a sidewall of the vehicle tire and then by a bead of the vehicle tire, intended to come into contact with the nominal rim, wherein the crown, the sidewalls, and the beads delimit a toroidal interior cavity, wherein the vehicle tire has an equatorial plane passing through a middle of the radially outer tread surface and perpendicular to an axis of rotation of the vehicle tire, wherein the vehicle tire further comprises a stiffening structure, distributed circumferentially around an entire circumference of the vehicle tire and comprising two stiffening elements, each extending continuously in the toroidal interior cavity from a crown interface connected to a radially inner face of the crown to a bead interface connected to an axially inner face of the bead, wherein each stiffening element comprises filamentary reinforcing elements that are partially uncoated with an elastomer compound to make the stiffening element unsealed, except at portions of the stiffening element, which form the crown interface and the bead interface, respectively, and in which the filamentary reinforcing elements are coated with the elastomer compound, wherein the crown interface of each stiffening element is positioned, with respect to the equatorial plane, at an axial distance A at most equal to 0.45 times the axial width S, and wherein the bead interface of each stiffening element is positioned, with respect to a radially innermost point I of the axially inner face of the bead, at a radial distance B at least equal to 0.10 times the radial height H and at most equal to 0.5 times the radial height H.

2. The vehicle tire according to claim 1, wherein the two stiffening elements are positioned symmetrically on either side of the equatorial plane.

3. The vehicle tire according to claim 1, wherein the axial distance A is at least equal to 0.05 times and at most equal to 0.15 times the axial width S.

4. The vehicle tire according to claim 1, wherein the radial distance B is at least equal to 0.10 times the radial height H and at most equal to 0.35 times the radial height H.

5. The vehicle tire according to claim 1, wherein the crown interface is distributed across a width A1 at least equal to 0.1 times the axial width S.

6. The vehicle tire according to claim 1, wherein the crown interface comprises a cushion made of elastomer compound positioned at least partially between the stiffening element and the radially inner face of the crown.

7. The vehicle tire according to claim 1, wherein the crown interface is distributed across a width A1, and wherein the bead interface is distributed across a width B1 at least equal to the width A1.

8. The vehicle tire according to claim 1, wherein the bead interface comprises a cushion made of elastomer compound at least partially in contact with the stiffening element and the axially inner face of the bead.

9. The vehicle tire according to claim 8, wherein the cushion made of elastomer compound of the bead interface is at least partially in contact with a reinforcing layer such that the cushion is delimited by the stiffening element, the axially inner face of the bead, and the reinforcing layer.

10. The vehicle tire according to claim 1, wherein each stiffening element comprises a material selected from the group consisting of an aliphatic polyamide polymeric material, an aromatic polyamide polymeric material, a polyester polymeric material, a metal material, a glass material, a carbon material and combinations thereof.

11. The vehicle tire according to claim 1, wherein the filamentary reinforcing elements of each stiffening element are mutually parallel and form, with a circumferential direction of the vehicle tire, an angle C1 at least equal to 85° and at most equal to 95°.

12. The vehicle tire according to claim 1, wherein the filamentary reinforcing elements of each stiffening element comprise:

first filamentary reinforcing elements, which are mutually parallel and which form, with a circumferential direction of the vehicle tire, an angle C1 at least equal to 45° and at most equal to 75°, and filamentary reinforcing elements, which are mutually parallel and which form, with a circumferential direction of the vehicle tire, an angle C2 at least equal to 45° and at most equal to 75°, the second filamentary reinforcing elements being crossed with respect to the first filamentary reinforcing elements.

13. The vehicle tire according to claim 12, wherein the angles C1 and C2 are equal in terms of absolute value and opposite.

14. The vehicle tire according to claim 1, wherein the radial distance B is at least equal to 0.25 times the radial height H and at most equal to 0.5 times the radial height H.

15. The vehicle tire according to claim 1, wherein the crown interface of each stiffening element is formed by a first longitudinal end portion of the stiffening element, is connected to the radially inner face of the crown, and the bead interface of each stiffening element is formed by a second longitudinal end portion of the stiffening element, connected to the axially inner face of the bead, such that, when working under tension, each stiffening element extends in length, between the crown interface and the bead interface of the stiffening element, in a straight direction inclined with respect to the equatorial plane.

* * * * *